(12) United States Patent
Fredriksson et al.

(10) Patent No.: US 7,188,162 B1
(45) Date of Patent: Mar. 6, 2007

(54) METHOD AND EQUIPMENT FOR SETTING UP A PROTOCOL/SYSTEM PROTOCOL

(75) Inventors: Lars-Berno Fredriksson, Kinna (SE); Daniel Berglund, Angered (SE)

(73) Assignee: Kvaser Consulant AB (SE)

( * ) Notice: Subject to any disclaimer, the term of this patent is extended or adjusted under 35 U.S.C. 154(b) by 0 days.

(21) Appl. No.: 09/171,013

(22) PCT Filed: Apr. 8, 1997

(86) PCT No.: PCT/SE97/00581

§ 371 (c)(1),
(2), (4) Date: Oct. 9, 1998

(87) PCT Pub. No.: WO97/40429

PCT Pub. Date: Oct. 30, 1997

(30) Foreign Application Priority Data
Apr. 19, 1996 (SE) .................................. 9601494

(51) Int. Cl.
*G06F 15/177* (2006.01)
*G06F 15/16* (2006.01)

(52) U.S. Cl. .................. 709/221; 709/230; 703/13; 703/22; 703/23; 716/19; 717/105; 717/138

(58) Field of Classification Search ................ 709/230, 709/221, 223–224; 703/13, 22–23; 716/19; 717/104–105, 138
See application file for complete search history.

(56) References Cited

U.S. PATENT DOCUMENTS 5,103,421 A * 4/1992 Ward et al.
5,452,201 A * 9/1995 Pieornek et al. ............. 364/188
5,530,643 A   6/1996 Hodorowski ................ 364/191
6,055,619 A * 4/2000 North et al. .................. 712/36
6,112,312 A * 8/2000 Parker et al. ................ 714/32
6,938,148 B2 * 8/2005 Moore et al. ............... 712/216

FOREIGN PATENT DOCUMENTS

| GB | 2 266 608 A |   | 4/1993 |
| GB | 2 266 608 A | * | 11/1993 |
| WO | WO 90/08988 |   | 8/1990 |

* cited by examiner

Primary Examiner—Frantz B. Jean
(74) Attorney, Agent, or Firm—Connolly Bove Lodge & Hutz, LLP; Larry Hume

(57) ABSTRACT

A method is used for generating a system protocol for control and/or monitoring equipment for one or more machines and/or processes. The equipment comprises a number of modules which can communicate with each other via a serial digital connection in accordance with said system protocol. A first memory location is fed with first data concerning a base protocol and is also supplied with second data concerning one or more additional protocols which indicate possible basic functions for the mutual relationship of the modules in the intercommunication. A second memory location receives third data concerning a base protocol and can also be supplied with fourth data concerning one or more additional protocols which indicate desired basic functions for the mutual relationship of the modules in the intercommunication. The system protocol is based on first, second, third and fourth data in said first and second memory locations.

24 Claims, 14 Drawing Sheets

METHOD AND EQUIPMENT FOR SETTING UP A PROTOCOL/SYSTEM PROTOCOL

TECHNICAL FIELD

The present invention relates to a method for developing a machine control system and/or process control/monitoring system which operates with the CAN protocol in accordance with standard ISO 11898 or a variant thereof. Such CAN systems include modules which can communicate with each other via a digital serial communication, where control and/or monitoring functions from a first module, or from a unit which can communicate with the CAN system, can be sent to one or more other modules.

PRIOR ART

It is already known to use methods based on use of computers with software and associated peripherals for creating models of systems and subsystems and components within systems. Reference is made to U.S. Pat. No. 5,452, 201. It is also known, using the CAN protocol as base, to add higher protocol levels which, together with so-called profiles, create system protocols. Examples of this are DeviceNet from ODVA (USA) and Smart Distributed System (SDS) from Honeywell (Scotland). it is also known to construct system protocols, with CNA as base, where higher protocol levels are present in modules in the form of protocol primitives, and where the final system protocol primitives, and where the final system protocol is created by an initiation procedure only when the system construction has been completed. Examples of this are CAN Kingdom from KVASER (Sweden).

DISCLOSURE OF THE INVENTION

Technical Problem

The CAN protocol covers only the lowest functions in a protocol for a distributed control system. The only service which is offered is that of sending messages of limited length, maximum eight bytes, and of requesting transmission of a message. One or more higher protocol levels are therefore always needed. For CAN, there are presently a number of such protocols proposed, for example Smart Distributed System, J1939, DeviceNet, OSKE, CAL/CANopen, M3S, CAN Kingdom, etc., and there will probably be more. Most of said protocols are only base protocols and presuppose that further levels, so-called profiles, are added. There are also often requirements over and above those set out in the CAN specification relating to cables, contacts, drives, protective circuits, etc. The profiles can be said to be a detailed specification, over and above the protocol specification, which certain modules must satisfy. For example, in DeviceNet there are, inter alia, profiles for limit switches, inductive switches, photoelectric sensors, and corresponding profiles are found in other protocols such as Smart Distributed Systems. The idea is that it will be possible, using a profile, to create a complete protocol for each module, and when these are then coupled to the CAN bus, the whole system will then function. This is the case only in very simple systems, and there is therefore often a requirement that the modules can be adapted to the final system. Examples of such adaptation are that the system designer can make a final decision as to which CAN identifiers are to be used in the system. CAN Kingdom has a special place in the protocol range since the protocol presupposes that the system designer can at least freely assign CAN identifiers to all modules and that the module designer has the possibility of leaving to the system designer a number of decisions regarding how the final protocol will be constructed.

If we study existing profiles, we find that the same profiles, with small modifications, are proposed both for a given CAN protocol and for other protocols, for example Interbus-S or Profibus. We also find that certain functions are to be found in different ways in different profiles for the same protocol, and that profiles for the same module types are found in different protocols. In many instances the differences can be annoyingly small. For example, a variable may have the same data format, but have a different name, or two protocols prescribe different handshaking procedures between two modules which are to exchange information with each other, etc. For example, DeviceNet prescribes "Double MACID check", something which CAN Kingdom does not have. But for this, a DeviceNet module would be able to exchange information with a CAN Kingdom module. A system designer who wants to integrate a DeviceNet module into his CAN Kingdom system can do so by making his system module (Capital according to the CAN Kingdom specification) execute the "Double MACID" procedure and by so doing "lure" the DeviceNet module into believing that it is operating in a DeviceNet system. It is often the case that not all characteristics in a module are described in the profile, but that the module designer has seen the profile as a minimum requirement and has thereafter added further characteristics.

In order to reduce the development time and to minimize costs, a system designer will want to be able to use standard modules in his system. From what has been explained above, it will be clear that choosing suitable modules is a complicated task, especially if the system is not of a standard type. If he chooses a protocol with profiles, then he has to choose from a large number of profiles. If he instead chooses modules of the CAN Kingdom type, then he has to study in detail each module specification in order to decide whether it is suitable or not. It may also be the case that he would like to use modules which follow different higher-level protocols, as in the example above with DeviceNet and CAN Kingdom. By using functions which lie outside standard profiles, combining modules constructed for different protocols, etc., a skilful system designer can create systems which have been performance or are more cost-efficient than systems which follow a current standard construction. As the number of higher-level protocols for CAN, the number of profiles within each such protocol, and the number of modules which can communicate via the CAN bus are increasing, the system designer has greater possibilities of creating unique system solutions. These possibilities are counteracted by the fact that it is ultimately a wellnigh impossible task to choose the correct modules from among all those available and, after this choice has been made, finally to modify the chosen modules in order to adapt them to the system.

Solution

That which can principally be regarded as characterizing a method according to the invention is that it involves descriptions of modules and systems in a form suitable for computer processing, and that the system designer can, with computer support, construct a model of his system and that he can introduce a database in the computer with a description of modules and coupling units, and that the computer can then compare the parts in the system model with corresponding or like parts in the database and, from this, can select and propose suitable units for the system. The description of modules is constructed with a base protocol, in this case CAN, and a number of additional protocols which refer to different standards and in the present case to profiles for these additional protocols. At each such level there is also a description of any deviations from what is described in the standard, profile or other general documentation referred to. This information is stored in a memory location in the computer and is then transferred in suitable format to a medium available to the system designer. This can be a database accessible via the Internet, CD-ROM distributed by mail, floppy disks, etc. It may be expedient at the same time to store all other information items concerning the module which are relevant to the system designer, for example the specifications, handling description, etc., in one or more text files at the same location.

The method according to the invention involves the work of the system designer being divided into three phases: A first phase in which the system designer works with module models according to his own wishes, hereinafter called "dummy modules". These need not correspond to existing modules. A computer program, hereinafter called the "system tool", helps him to check that the system is logically correct and to assess performance. In a second phase, the dummy modules are compared with real modules described in a database. For each dummy module the system tool selects possible real modules. The system designer can now replace his dummy modules with real modules, and the system tool tests logic and performance once again and presents any deviations and necessary corrections. The system designer can now make a final model of the system. In a third phase, the system tool can, at least if all the modules follow CAN Kingdom, generate the necessary adaptation information for each module, as well as a documentation of the system. If the system designer has chosen a system module known to the system tool, called Capital in CAN Kingdom, then the system tool can also generate a compilable code for the configuration and startup procedure according to CAN Kingdom.

DESCRIPTION OF THE FIGURES

A presently proposed embodiment will be described hereinbelow with reference to the attached drawings, in which.

DETAILED EMBODIMENT

Figure 1:
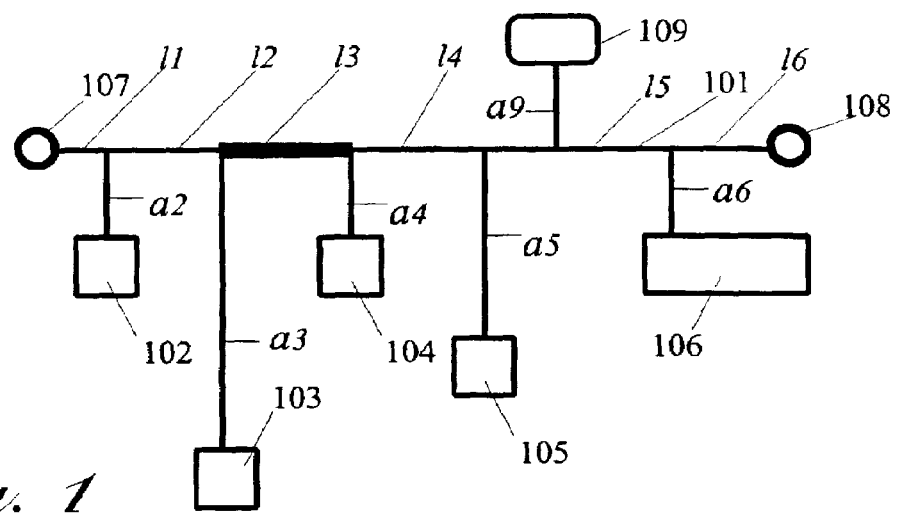
FIG. 1 shows a block diagram of a CAN system.

The object is to create a CAN system with the aid of computer support. FIG. 1 shows such a system with the bus 101 which contains a twisted pair for CAN signaling and a twisted pair for power supply. Modules 102, 103, 104, 105 and a system node 106, called Capital in CAN Kingdom, are connected to the bus 101. The CAN bus ends in the usual manner with terminations 107 and 108, and the modules are powered by the power supply unit 109. The bus 101 consists of different parts 11, 12, 13, 14, 15, 16 which can have different lengths and characteristics such as impedance, wave propagation speed, resistance, etc. as is illustrated by the differing thickness of the part 13. The modules are connected by leads a2–a6, and the power supply unit 109 by a9. These leads also have different characteristics. FIG. 1 shows a common design with a pure bus topology, although systems can have other designs which are variants on bus topology or star topology.

Figure 2:
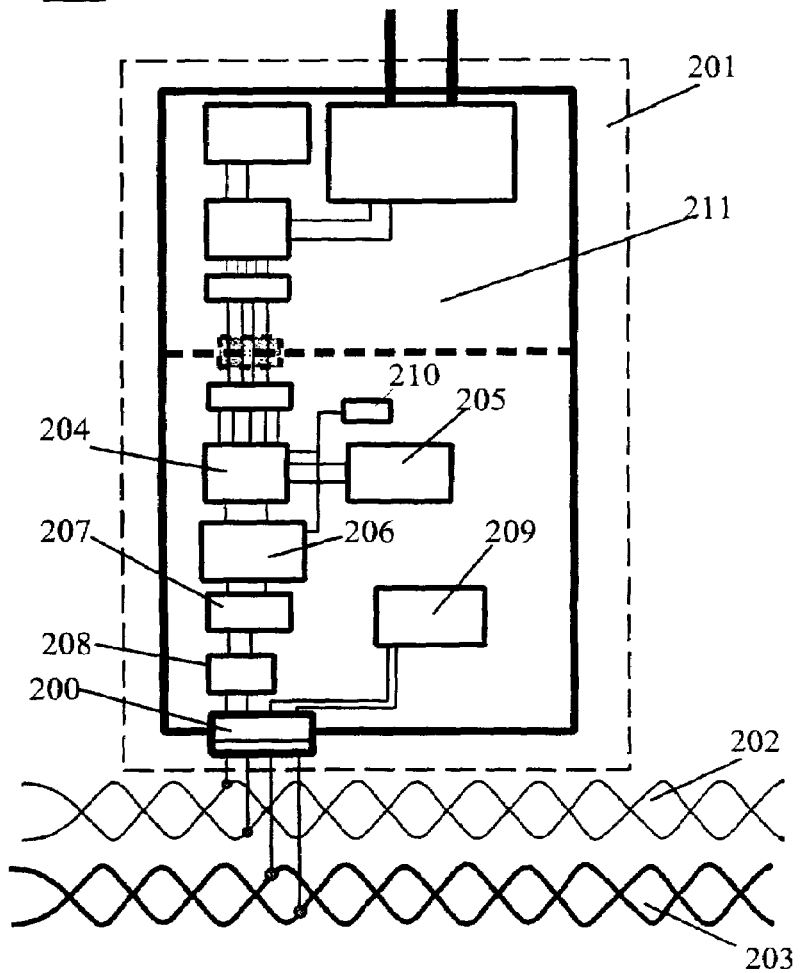
FIG. 2 shows a block diagram of a module included in the CAN system according to the figure.

FIG. 2 shows a module 201 which is connected to the CAN bus 202 and the power supply bus 203 via the contact device 200. The module 201 has one or more CPUs 204, memories 205, CAN controllers 206 (for example Intel 527) incorporated in the CPU or freestanding, CAN drivers 207 (for example Philips 251), communication adaptation circuits 208, voltage regulator 209, oscillator 210, etc., shown diagrammatically, built for the CAN protocol, which are connected/can be connected to a unit 211 (not described in detail) which gives the module its physical characteristics which are used in the system, for example to control an engine, read off the position of a lever, or the like.

The description of the computer support means is divided into two parts: a) description of the module tool and b) description of the system tool.

a) Description of the module tool

Figure 3:
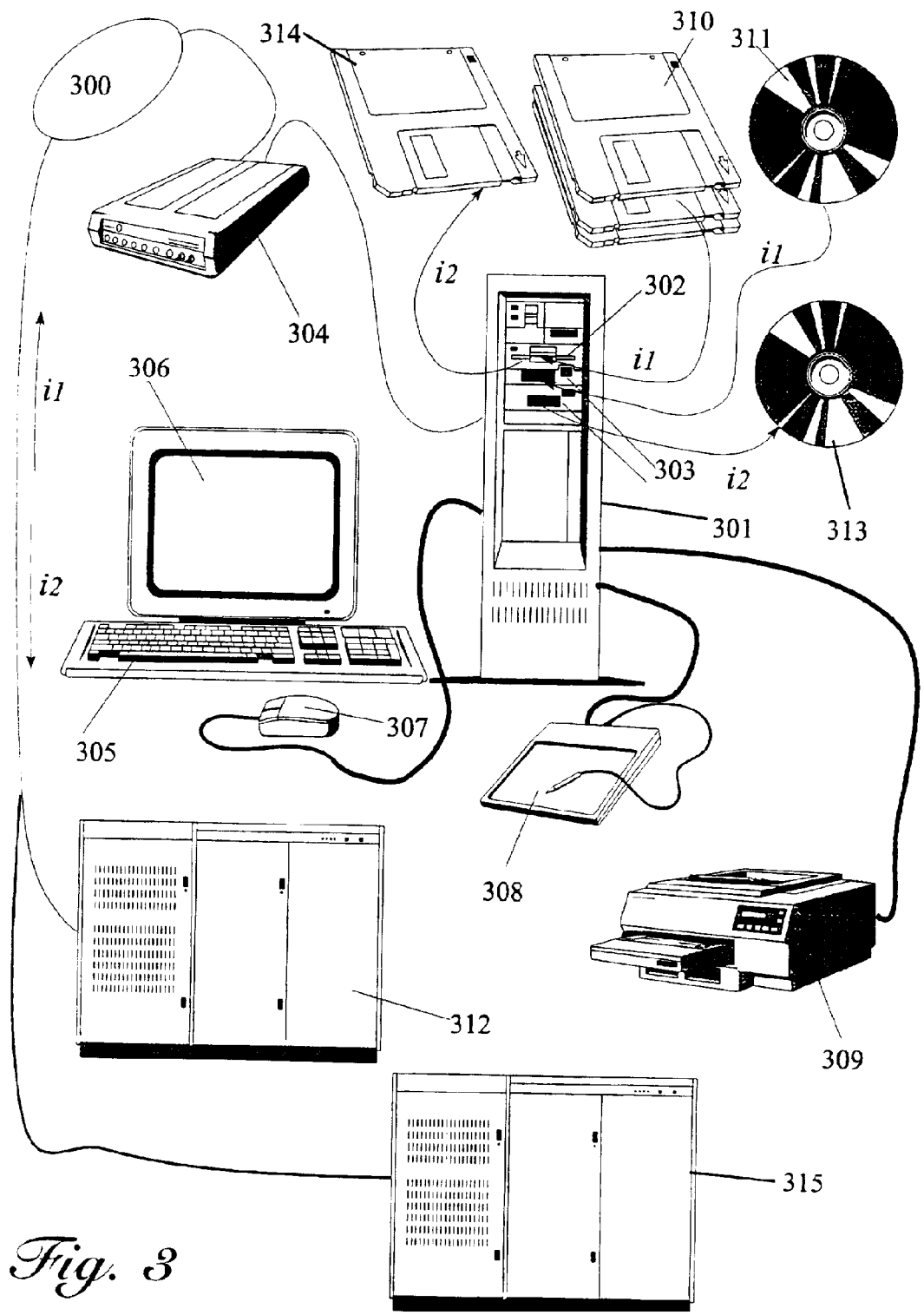
FIG. 3 shows a circuit diagram of hardware for generating the module tool in the form of a computer program.

The module tool is a computer program, which is executed in a first computer, for module designers and has the task of generating as complete as possible a description of a module in a form which can later be interpreted for the system tool. Examples of suitable hardware are shown in FIG. 3, where 301 is a PC with a Pentium CPU, hard disk holding 1 Gbyte and 16 Mbyte RAM, and floppy disk drives 302, CD drives 303, and which is connected via modem 304 to the telephone network 300. It can also be connected to a LAN in a known manner (not shown in the figure). The computer is equipped with keyboard 305, screen 306, mouse 307, and, if appropriate, also with digitizer 308 and a printer 309. The module tool program is supplied with a data medium, for example on diskette 310, CD 311, or from another computer 312 as data file i1 via the telephone network 300.

The module tool has two parts, one which describes the module in hardware terms, and one which describes the module in software terms.

In the software-related part, information is input concerning which higher-level protocol is used. For each higher-level protocol there then follows an adapted read-in routine. If the higher-level protocol is CAN Kingdom, for example, there follows relevant information as to which king's letters are supported and to what extent they are supported. If the protocol is DeviceNet, there follows a read-in as to which profile is followed, etc. Each higher-level protocol has some form of identity for the producer and the module type. In DeviceNet this refers to a register with ODVA; in the case of CAN Kingdom to registration of EAN-13 code with the organization EAN International which has offices in most industrialized countries. This information is input. Information is also input as to which variables the module can transmit and receive, which data formats they have, or if they are found in any generally accepted profile or if the format can be set up on the command from a system node, tool or the like, depending on the chosen higher-level protocol. The module tool organizes the information in a database format in such a way that the system tool can later couple variables in different modules to each other, calculate performance, etc. Information which the system tool cannot use, but which can be of value to the system designer, is placed in one or more files which the system designer can read via the system tool. Examples of such information are personal data on the individual who has created the module description, information details on the module which are of importance to the system but which the system tool cannot (yet) take into consideration, such as measurement information, chosen components, MTBF, detailed handling description, etc. The information organized in this way is thereafter transferred to a medium which gives the system designer the possibility of introducing it into his tool. For this purpose, the information i2 can be placed in a database 315 which is generally accessible on any data network, for example Internet via the telephone network 300, or on CD-ROM 313, diskette 314, etc. It is advantageous for the information to be generated in the form of a text file which can then be read in by the system tool. Since the information is important for the further processing, the text file should be provided with information concerning the individual and/or company responsible for creating the file, with which tool it has been created, and some form of protection against corruption. An EAN code may be suitable for identifying the company and tool. This also allows identification of the individual to be included, for example by the serial number consisting of the individual's registration number. To ensure that the text file remains uncorrupted, it can be provided with a check code in accordance with any currently accepted method.

Figure 4:
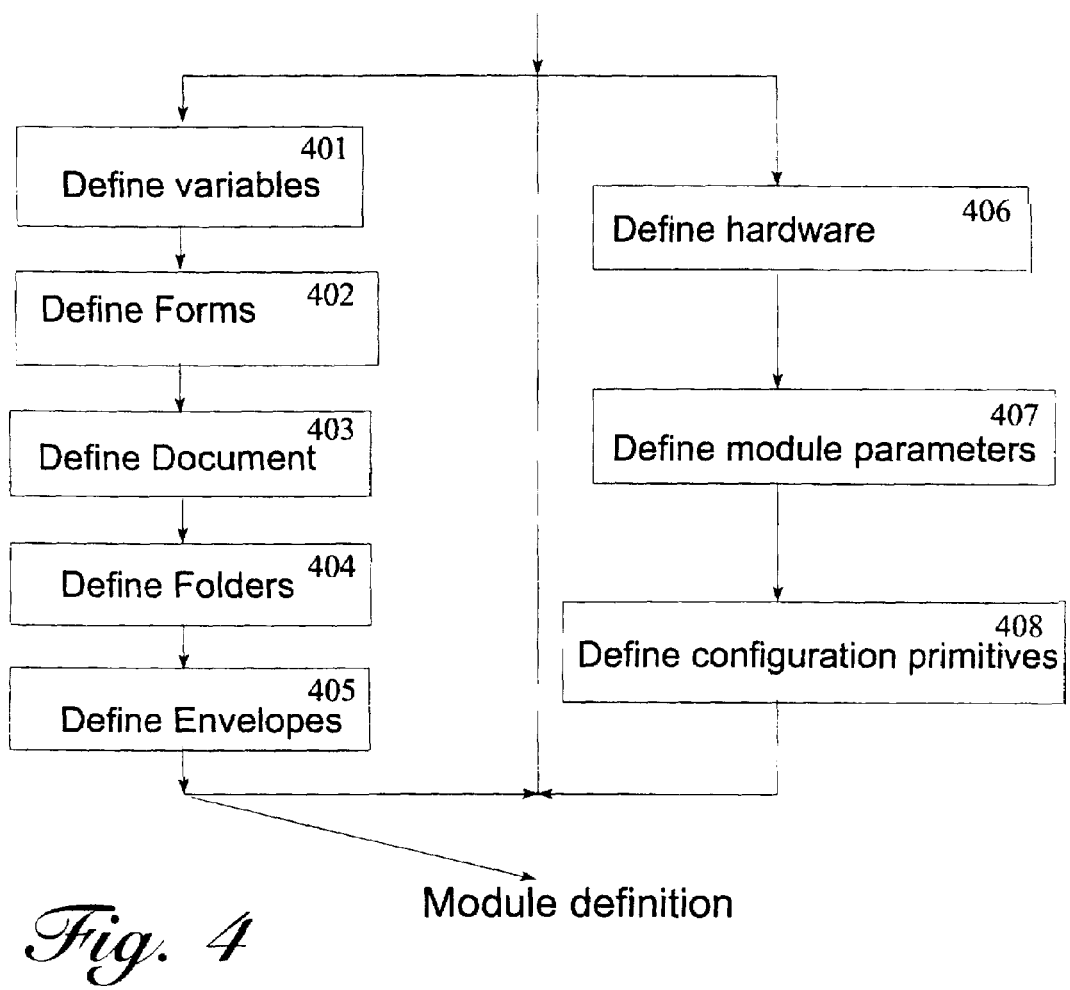
FIG. 4 shows a flow chart.

The main procedure for creating a module definition with the module tool is shown in FIG. 4. Variables 401 are first defined. A fundamental concept in the module description is the variable. The variables in a module define which information the module can produce or consume. A variable is defined with a name, a symbolic abbreviated name, its data representation, its data type, its direction (transmit variable, receive variable, or both), its normal value (default), its production time (for transmit variables) or execution time (for receive variables), possibly a bit mask, and a detailed description on free format. It is also possible to define physical parameters such as unit (volt, kelvin, ampere, meter per second, etc.) and maximum value and minimum value. Variables are a protocol-independent concept and each module definition thus contains a number of variables, irrespective of which higher-level protocol one chooses to use. Variables can be combined arbitrarily into different groups, which in turn can be grouped. This grouping has merely an administrative purpose and serves to facilitate the work with the tool. In the simplest case, the data representation thus involves such well-known concepts as "unsigned integer", "signed small integer", etc.; length in bits and byte order (intel or motorola) can be specified individually for each variable. It is also possible to define combined variables, which are a group of variables defined in accordance with the above, under a common name (cf. struct ic). The combined variable is then handled as a unit. There is the possibility of defining different time-staggered phases in a module, for example startup phase, operating phase, and idle phase. A variable can be defined to apply only during one or more such phases.

Figure 5:
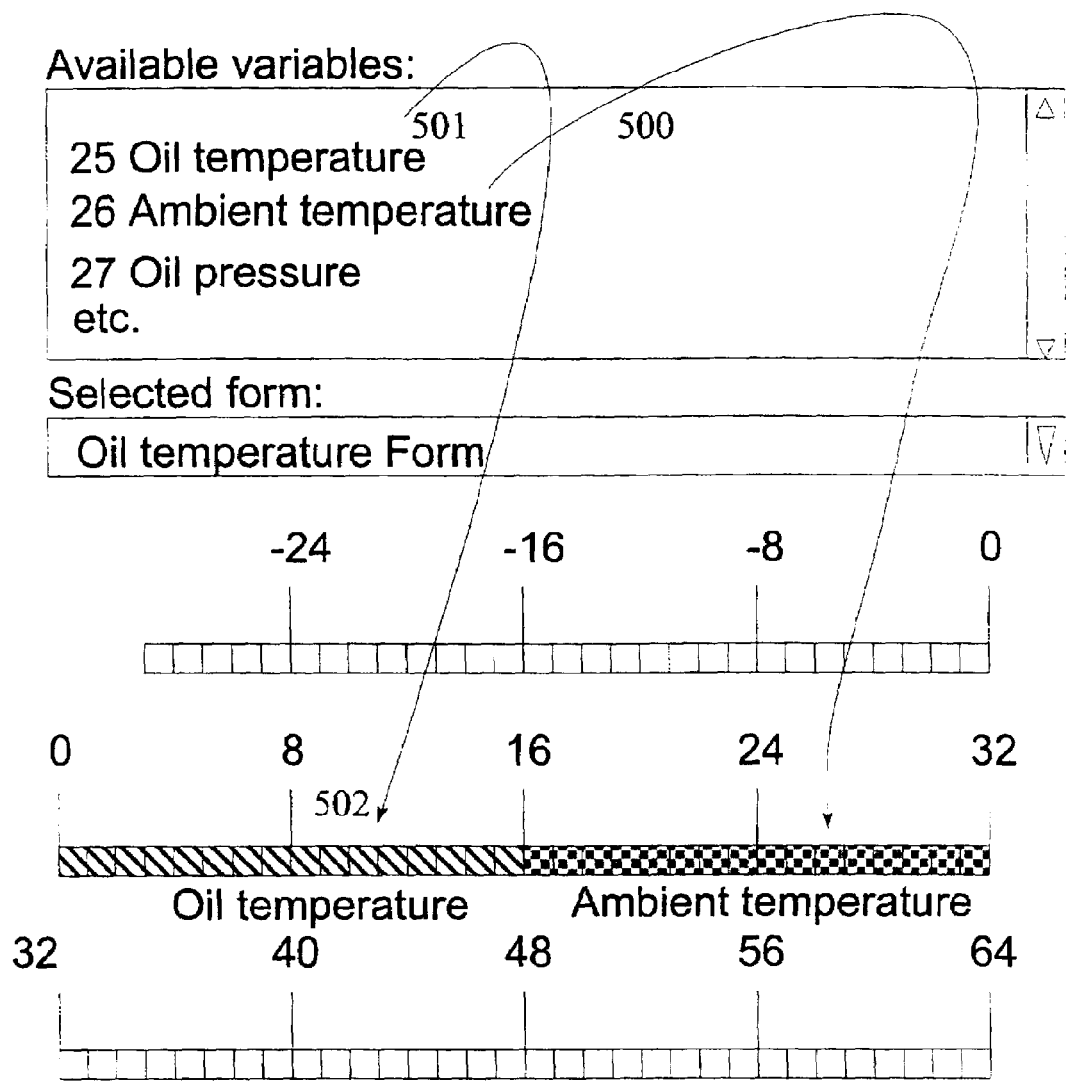
FIG. 5 shows the principles of a method for definition of format according to FIG. 4.

When the variables are defined, the message layout must be defined in some way. Different ELPs permit different degrees of flexibility in this respect. If CAN Kingdom is used, a number of Forms 402 are defined. Each Form is defined separately with a name, a symbolic abbreviated name, a number, a list number, direction (transmit or receive), and a description in free format. The Form layout is then defined: variables can be placed at an arbitrary location in the Form, which in principle serves as a mapping to or from a CAN message. FIG. 5 shows the principle of the procedure. The position of each variable is defined with its start position, which is the position for the least significant bit in the variable. Extent and direction in the Form is then given implicitly by the definition of the variable (length and byte order). The user does this with a graphic interface which shows the Form as a number of consecutive bits (which, when using CAN, are numbered from −29 to −1 for the arbitration field ("CAN ID") and 0 to 63 for the data field). From a list 500 of available variables, the user can then "pull down" variables, for example 501, to the Form and "drop" them at the desired location, for example 502, and in the same way adjust the location of variables already in the Form. Overlapping variables are shown with a special color. In addition to the variables which are defined in accordance with the above, the program offers a number of pre-defined variables of special importance, for example "Reserved", "Page number" (used in next stage), "Node number", "Base number", and other module parameters.

During definition of the Form layout, different search terms can be used in the variables list, for example only variables of specific data representation are shown. Also as regards the Forms, they can be grouped into arbitrary administrative groups, or defined to apply only in certain operating phases.

The next stage is to define a mapping from the content in a certain part of the message ("Page number") to a certain message layout ("Form"). In CAN Kingdom this is done by defining Documents 403, which are a collection of Forms. Each document is defined separately with a name, a symbolic abbreviated name, a number, a list number, a direction, and a detailed description. The user then defines which Forms are to belong to the document and gives each Form a number in the document. The program then checks that all the Forms in the document have their page numbers at the same location (bit position). the module will then use the content at this location in the CAN messages to determine which Form is to be used to interpret the message in question. For outgoing messages the reverse procedure is applied: the module construes the content in the page number on the basis of which number the Form has in the document in question. Documents are identified by a number plus a list number. These numbers are defined by the module designer (in accordance with the above).

In order to permit uniform numbering of the documents in the system, the module designer (when using CAN Kingdom) defines Folders 404, which serve as a mapping from document numbers in the system to document numbers in the module, and vice versa. Like Documents and Forms, a Folder is defined with a name, a symbolic abbreviated name, a number and a detailed description. The module designer then defines the content of each Folder, i.e. whether it is empty and the system designer can add a Document, or which Document is located there when some other module refers to the corresponding Folder's number.

The module designer also has the possibility of defining a mapping from CAN bus identifiers ("Envelopes") to Folders and vice versa, 405. This is done by calculating which Envelopes correspond to a given Folder. If CAN Kingdom is used, this stage is normally omitted, since in this case the module obtains this information during the running of the system; but it may be necessary for other protocols.

The abovementioned structures (Variables, Forms, Documents, Folders, Envelopes) can either be defined by the module designer in accordance with the above, or defined dynamically during the system startup phase or during running. For dynamic definition, support is of course required for this from the HLP (Higher-Level Protocol) which the module implements. For HLPs which permit such dynamic definition primitives ("King's Pages" in CAN Kingdom) the module offers. For each King's Page it is possible to indicate to what extent the primitive is implemented, as also whether any irregularities are present. Further module parameters such as node number, base number, series number, EAN number, etc., can also be indicated and saved in the module definition.

In the hardware-related part, information (406) is read-in concerning characteristics which depend on how the CAN part, illustrated in FIG. 2, is constructed. Examples of such information are which CAN Controller is used, time delays due to the hardware used, oscillator accuracy, contact design, supply voltage, current consumption, etc. It is also possible to define how the physical part (210) of the module can be configured (407) and the information which has to be present before CAN communication can take place, for example the module's location in the system, baud rate, etc. It is also possible to define at 408 which HLP is followed and which parts within this, possibly profiles, etc. Many modules can be reconfigured in many ways via CAN messages, which is also defined.

The module designer can also define dummy modules. This is a normal module in which the entire message layout (Forms, Documents, Folders, Envelopes) is undefined. However, the definition contains variables and hardware parameters in the same way as above. The dummy module is marked specially on the screen and serves as a template (i.e. search profile) for the system designer when a module is to be selected from the module database.

Organization and Implementation

To organize a module definition in the computer memory, any form of commercially available object or relational database can be used, for example paradox from Borland. For the sake of clarity, the description which follows concerns a simple model of how the tables are to be organized. All variables are stored in a table, where module id and variable id constitute a combined key. The following SQL set creates the variables table (Local SQL for Paradox 5.0).
CREATE TABLE VARS ( MODULENO INTEGER, VARNO INTEGER, NAME CHAR (100), DESCRPTION BLOB (1,1), DATASIZE INTEGER, DATAREPR INTEGER, DATATYPE CHAR (25), TRANSMIT BOOLEAN, RECEIVE BOOLEAN, OWNER SMALLINT, LITTLEENDIAN BOOLEAN, EXECTIME INETEGER, NICKNAME CHAR (32), DEFCONTENTS CHAR (32), PRIMARY KEY (MODULENO, VARNO))

The Forms are stored in another table, defined by the following SQL set:

CREATE TABLE FORMS ( MODULENO INTEGER, FORMID INTEGER, NAME CHAR (100), DESCRIPTION BLOB (1,1) OWNER SMALLINT, NICKNAME CHAR (32), RATIONALE BLOB (1,1), FORMNO INTEGER, PRIMARY KEY (MODULENO, FORMID)
CREATE INDEX FORMNUMBER ON FORMS (MODULENO, FORMNO)

The Documents are stored in a table as follows:
CREATE TABLE DOCS ( MODULENO INTEGER, DOCID INTEGER, NAME CHAR (128), DESCRIPTION BLOB (1,1), OWNER SMALLINT, NICKNAME CHAR (32), RTR BOOLEAN, DOCNO INTEGER, PRIMARY KEY (MODULENO, DOCID))
CREATE INDEX DOCNUMBER ON DOCS (MODULENO, DOCNO)

The Folders are stored in the following table:
CREATE TABLE FOLD ( MODULENO INTEGER, FOLDERID INTEGER, NAME CHAR (50), DESCRIPTION BLOB (1,1), OWNER SMALLINT, NICKNAME CHAR (32), DLC INTEGER, RTR BOOLENA, FOLDERNO INTEGER, PRIMARY KEY (MODULENO, FOLDERID))
CREATE INDEX FOLDERNUMBER ON FOLD (MODULENO, FOLDERNO)

The Envelopes are stored in the following table:
CREATE TABLE ENV ( MODULENO INTEGER, ENVID INTEGER, FOLDERID INTEGER, STANDARD BOOLEAN, OWNER SMALLINT, ENVNO INTEGER, PRIMARY KEY (MODULENO, ENVID))
CREATE INDEX ALLENV ON ENV (ENVNO)
CREATE INDEX ENVNBR ON ENV (MODULENO, FOLDERID, ENVNO)
CREATE INDEX ENVNBR2 on ENV (MODULENO, ENVNO)

The coupling between Variables and Forms is done with the following table:
CREATE TABLE FORMLAY ( MODULENO INTEGER, FORMID INTEGER, LAYOUTNO AUTOINC, VARIABLENO INTEGER, STARTPOS INTEGER, OWNER SMALLINT, DATASIZE INTEGER, PRIMARY KEY (MODULENO, FORMID, LAYOUTNO))
CREATE INDEX POS ON FORMLAY (MODULENO, FORMID, STARTPOS)
CREATE INDEX VAR ON FORMLAY (MODULENO, VARIABLENO)

The coupling between Forms and Documents is done with the following table:
CREATE TABLE DOCLAY ( MODULENO INTEGER, DOCID INTEGER, FORMID INTEGER, PAGENO INTEGER, OWNER SMALLINT, PRIMARY KEY (MODULENO, DOCID, FORMID, PAGENO))
CREATE INDEX PAGENUMBER ON DOCLAY (MODULENO, DOCID, PAGENO)
CREATE INDEX FORMNUMBER ON DOCLAY (MODULENO, FORMID)

The coupling between Documents and Folders is done with the following table:
CREATE TABLE FOLDCONT ( MODULENO INTEGER, FOLDERID INTEGER, DOCID INTEGER, OWNER SMALLINT, PRIMARY KEY (MODULENO, FOLDERID))
CREATE INDEX DOCUMENTNUMBER ON FOLDCONT (MODULENO, DOCID, FOLDERID)

The modules are stored in the following table:
CREATE TABLE MODULES ( NUMBER INTEGER, NAME CHAR (100), SCHEMATICNAME CHAR (50), DESCRIPTION BLOB (1,1), VENDOR CHAR (50), EAN CHAR (16), VENDORID CHAR (32), PICTURE BLOB (0,5), BITMAP BLOB (0,5), NODENO INTEGER, BASENO INTEGER, CAPITAL BOOLEAN, BASENOUNKNOWN BOOLEAN, SERIALNO CHAR (16), HWNAME CHAR (32), CANDRIVER CHAR (32), CANCTRL CHAR (32), CLOCKFREQ INTEGER, CLOCKACC INTEGER, EXTRADRIVERDELAY INTEGER, CSUM CHAR (16), FLAGS INTEGER, DUMMY BOOLEAN, PRIMARY KEY (NUMBER))

The couplings between variables are done with the following table:

CREATE TABLE VARASSG ( MODULENO INTEGER, SRCVARNO INTEGER, DSTMODULENO INTEGER, DSTVARNO INTEGER, PHASE INTEGER, PERIOD INTEGER, DEADLINE INTEGER, OWNER INTEGER, PRIMARY KEY (MODULENO, SRCVARNO, DSTMODULENO, DSTVARNO))
CREATE INDEX DEAD ON VARASSG (DEADLINE)
CREATE INDEX DSTVAR ON VARASSG (DSTMODULENO, DSTVARNO)

Information on the module's different data types is stored in the table DATAREP:

CREATE TABLE DATAREP ( NR INTEGER, NAME CHAR (40), DESCRIPTION CHAR (64), DATASIZE SMALLINT, COMPATIBLE_WITH INTEGER, PRIMARY KEY (NR))

and the table VARS stores for each variable a number which correspond to the field NR in this table.

Figure 6:
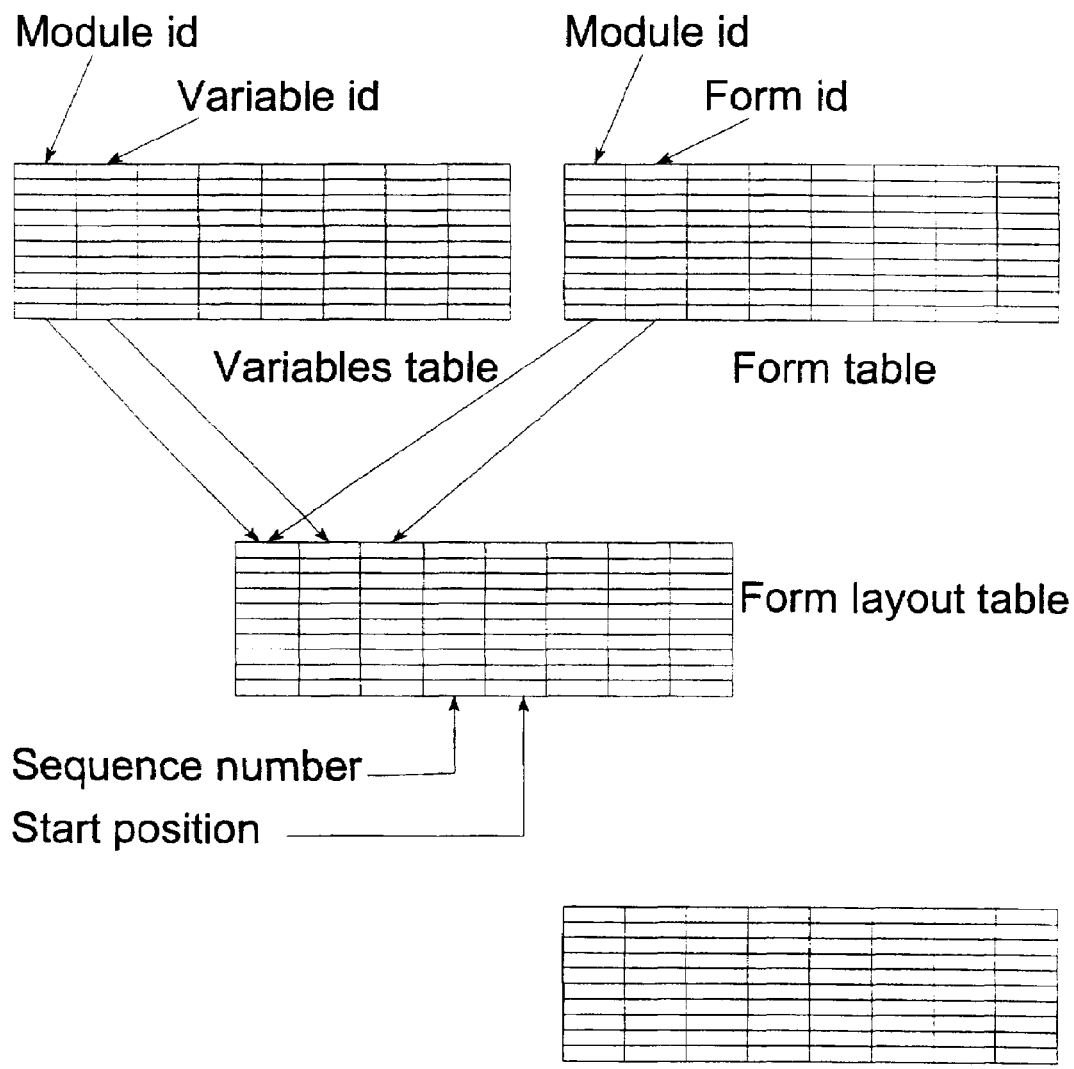
FIG. 6 shows an example of coupling of variables and format.

The couplings between the tables are done by means of coupled items containing identical values in their index field. For example (see FIG. 6), variables and Forms are coupled by indicating in each item in the FORMLAY table the module number, variable number, form number and a sequence number. This foursome identifies uniquely one item in FORMLAY, while at the same time th twosome (module number, variable number) uniquely identifies one variable, and the twosome (module number, form number) uniquely identifies one Form. For each item defined in this way in FORMLAY, the coupling attribute is also indicated, in this case the location of the variable on the Form (the STARTPOS field), and some administrative information (for example the OWNER field).

Couplings between other tables take place in a similar way.

It is less appropriate to use the database format directly when a module definition or system definition is to be distributed on data medium to other users of the tool. This is because there is no guarantee that all tools are using the same sort of database. For this reason it is possible to export a module or system definition in the form of a normal text file, which can then be imported to the receiver's tool in a simple way. The format on this text file is constructed such that it will be possible in future to add new information without having to change the format or create incompatibilities of some other kind.

The text file consists of a number of blocks which consist of a name (identifier) and an arbitrary number of items. An item can either in turn be a block, or consist of a name (identifier), an equal sign (=), and a value, which can be a numeral or a string, surrounded by quotation marks ("). To be able also to include signs which are without graphic representation (for example, carriage return, backspace, etc.), such a string can include special escape codes, which typically consist of back oblique (\), the letter 'x' and two hexadecimal numerals whose value (interpreted according to current ISO standard) indicates which sign is referred to.

The items within a block are demarcated by line ends. The block is introduced with left parenthesis ({) and ended with right parenthesis (}). The text file is introduced with a special block which defines the version number of the text file as such; this allows a tool to interpret different text files, even if these have been generated by different versions of the tool.

In the present definition of the text file contents, it contains a block for each table in the database. Each item in the database corresponds to a sub-block, and each filed in an item corresponds to an item in this sub-block.

The keys in the database are unique only within each installation of the program. To solve the problem with distribution of module and system definitions (the keys in a definition distributed with a module are not guaranteed to be unique when they are used in a certain installation), the module number in each item undergoes renumbering upon import of the abovementioned text file. Since the tables are always partly indexed with the module number, this renumbering suffices (no other fields need to be changed) and the procedure runs quickly and is easy to implement.

The module designer defines his module in accordance with the above, but if he chooses a suitable HLP, for example CAN Kingdom, he can leave some parts undefined. These parts are then filled in by the module's end user/system designer.

For each item in the database, information is stored on who has added it (or changed it), on the one hand information on the identity of the user, and on the other hand a field indicating whether the item "belongs" to the module or the system, and whether it has been generated manually or automatically. All items which are read from the module database are considered to belong to the module and are consequently protected against alteration in the system tool. The system tool can then generate a list of how the system is to be configured at startup, quite simply by ascertaining which items in the project database "belong" to the system and generating suitable adaptation information for each such item. The system tool can also distinguish between automatically generated items and items manually generated via the same fields, and it is therefore able to remove from the database information which has been generated on earlier runs with the system tool, without at the same time removing information which the user has added manually thereto. The fact that, for each item, information is stored concerning who (personal identification) has changed a certain item means that there is traceability within a project (or module). The tool can also store, in a separate log file, information concerning which changes have been made, so that it is also possible to save information which has been removed.

b) The system tool.

Figure 7A:
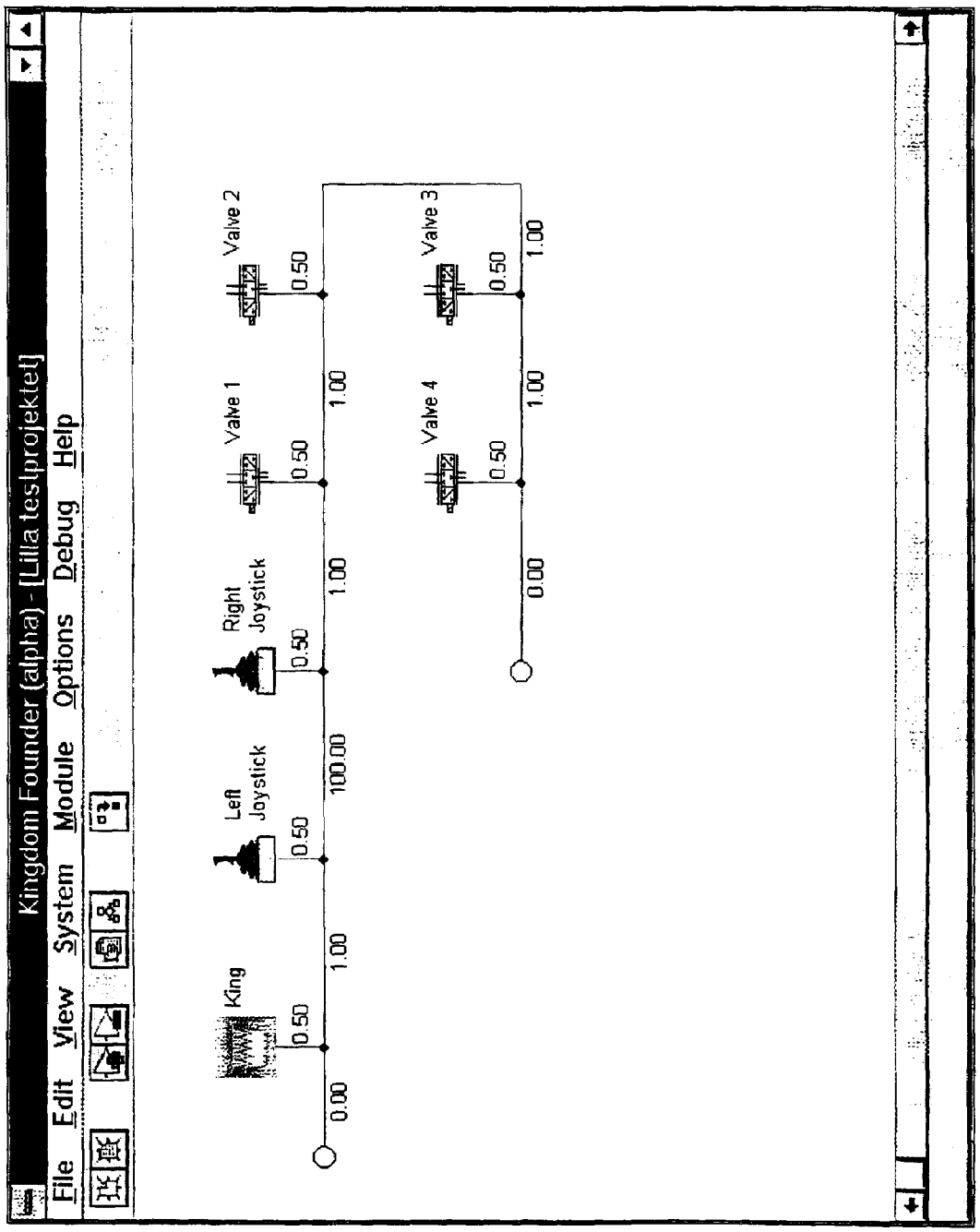
FIG. 7 shows examples of the layout of screen displays on the computer used.
Figure 7B:
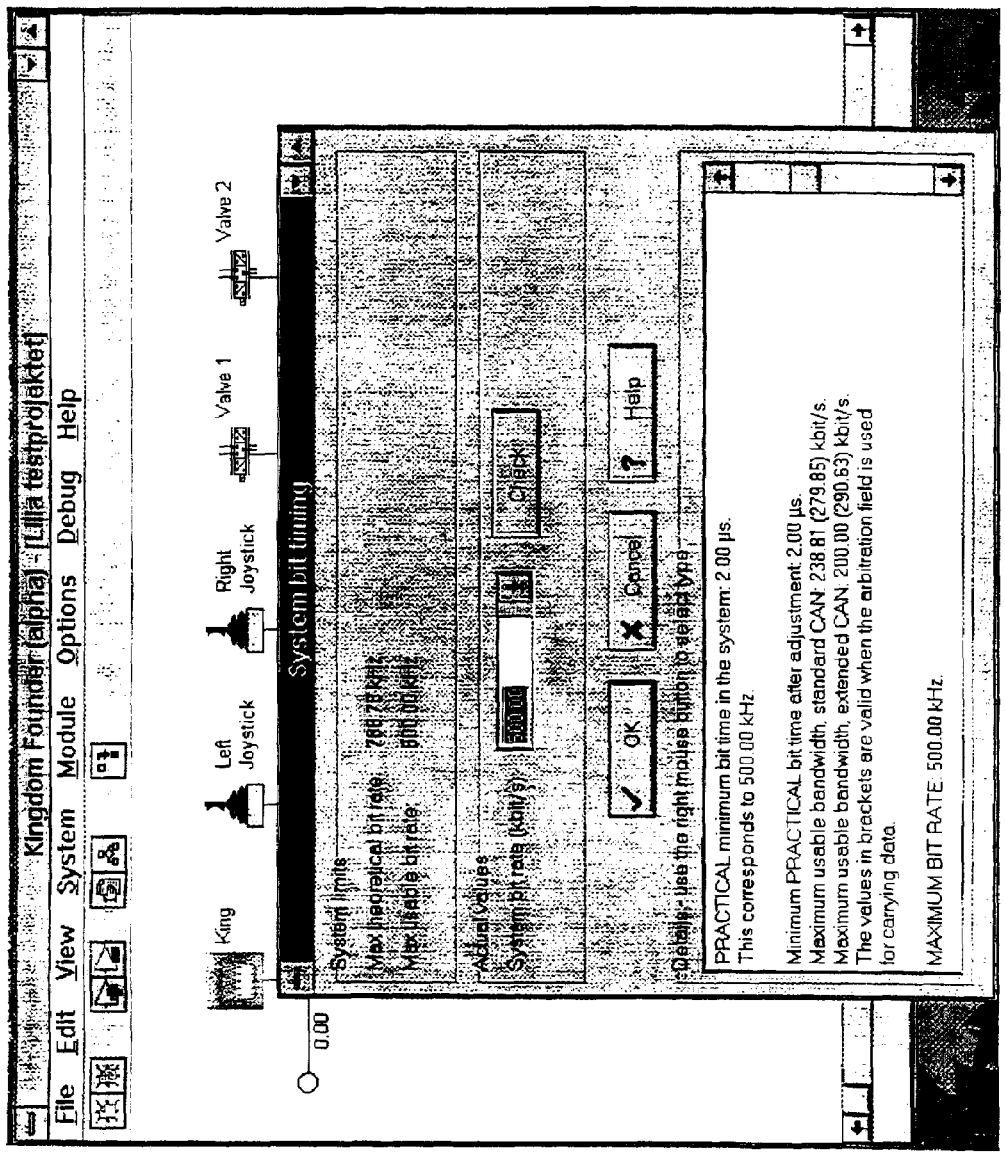

In the system tool, module models can be constructed in the same way as in the module tool. The system design is carried out in a second computer equivalent to the first computer which is shown in FIG. 2 and which has already been described. Information on several modules is read into the computer via data medium (media). The system designer begins his work by displaying on screen the number of dummy modules which he intends using in his system. These are coupled by lines which represent the CAN bus and connections thereto. The CAN bus can consist of several parts and can be branched. For reading into the system tool, said system tool includes, or the system designer can create, or the supplier can provide, models of cables, terminations, contacts, power supply, etc., with relevant physical data such as electrical resistance, resistance per meter, impedance, wave propagation speed, voltage, current, etc. This data is used to create a model of the system's hardware setup and characteristics by means of the CAN bus segment and the connections being coupled to the cable models, models of the voltage supply being input, etc. The dummy modules can have default values right from the start on the hardware description of these, and with this information the system tool can already calculate information relevant to the system designer, such as theoretical maximum bit rate, theoretical amplitude level, on each module, etc. This can lead to the system designer revising his choice of cable, choice of power supply and positioning, layout of the system, changing time delays, oscillator accuracy, etc. Examples of how a screen can appear during the operation are shown in FIG. 7.

When the system designer is satisfied with the physical construction of his network, he begins to add information to the dummy modules. This includes, but is not limited to, definition of variables in the same way as in the module tool. The variables in the dummy module represent the information which the system designer wishes to send between the different nodes in the system. The system designer then defines the information flow by associating the transmit variables in the various dummy modules with receive variables in other dummy modules in the system. For each such coupling there are, inter alia, time-related requirements concerning the transmission, such as, for example, a maximum permitted transmission time, a minimum interval between two transmissions, whether the transmission is periodic or aperiodic, etc. In the same way as with variable definition in the module tool, an association can be defined to apply only during certain system phases defined by the system designer, for example an operating phase, an idle phase or a startup phase.

With the information given, it is now possible for the system tool to calculate, on the basis of certain assumptions (for example that all variables are transported in separate CAN messages), whether the system can be schematized, i.e. whether all the information can be guaranteed to arrive within the stated maximum transmission time. There are one or more schematizing models in the tool (such as, for example, deadline monotonic, see Tindell et al.) for schematizing messages. The models can be of simpler types, which presupposes that no transmission errors occur, or of more complicated types, which also allow for the possibility of errors occurring. The system designer chooses a suitable model and the tool checks that the information needed for generating the scheme is read-in by the designer. If information is missing, this is requested by the designer; otherwise the schematizing is generated. Algorithms for such calculations are known (Tindell et al.). If the analysis reveals that some messages cannot be guaranteed to arrive within the stated maximum time, the system designer may take appropriate measures, such as increasing the bit rate on the bus or reducing the information flow in the system. The schematizing can, for example, end in a priority order for the transmit objects, generate times for when the messages are to be transmitted, indicate which messages are to initiate transmission of other messages, etc., all this depending on the principles around which the schematizing model/algorithm is built. Also calculated are maximum delay times or statistically probable arrival time, and a check is made to ensure that these lie within the limits set by the designer. If some limits cannot be met, this is shown in a table, or graphically on the screen.

Now the system designer has a requirements specification for all modules. The system tool can now go through the database and propose modules which completely or partially correspond to the respective dummy module. This is done by matching the variables of the dummy module with variables defined in the real module, and comparing these with regard to data format, physical unit and other defined variable parameters. Suitable modules are presented in a list on the screen. The system designer replaces a dummy module, several dummy modules or all dummy modules with suitable models of real modules. In certain cases the system tool can couple the dummy variables directly to corresponding variables in the respective module model, while in other cases the designer will effect this coupling manually. The simplest case is of course where all modules support the same higher-level protocol, but this is not necessary. When there is a system module in the system, modules which follow different higher-level protocols can often be made to exchange information relevant to the function of the system. The system node is programmed then to simulate functions which are needed in accordance with each protocol in all modules, but which are not present in those chosen by the designer, which follow another higher-level protocol. In a simpler variant of the system tool, this indicates only that the chosen module differs as regards higher-level protocol, and in an advanced variant the tool generates those functions and that information which is missing, and how it is to be added to the system. When the dummy module or modules is/are replaced, the system tool can carry out a further check and schematizing, and the system designer can successively refine his design.

Figure 9:
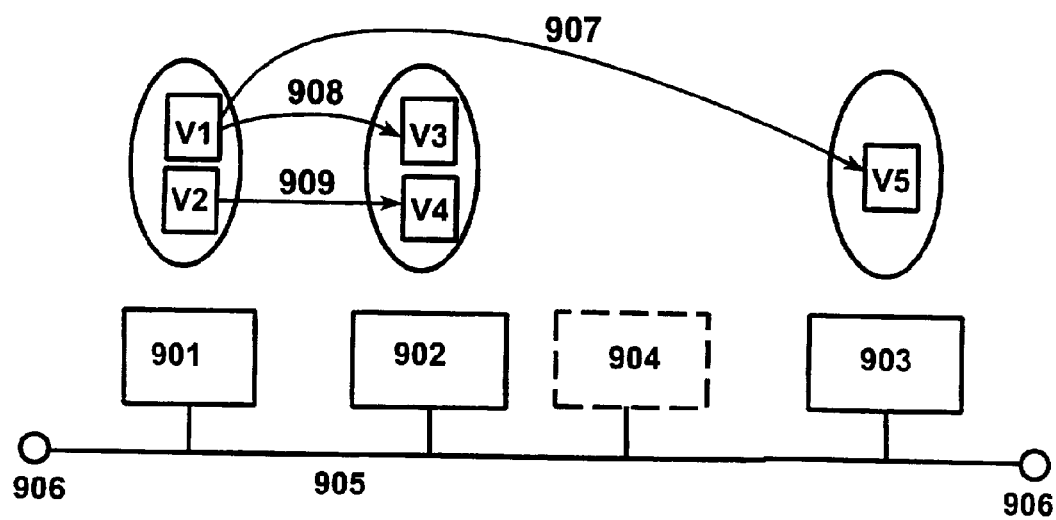
FIG. 9 shows a block diagram of the connection of modules to the CAN bus in an actual system.

The coupling between variables is shown in FIG. 9. In modules 901, 902, 903 connected to the CAN bus 905 there are variables V1, V2, V3, V4 and V5. With the system tool, the system designer combines V2 with V4 and thereby indicates that the information represented by V2 in the module 901 is to be transmitted to the module 902, where it will be assigned the variable V4. A variable can also have several receivers; in the figure the variable V1 is coupled to V3 in module 902 and to V4 in module 903.

Figure 10:
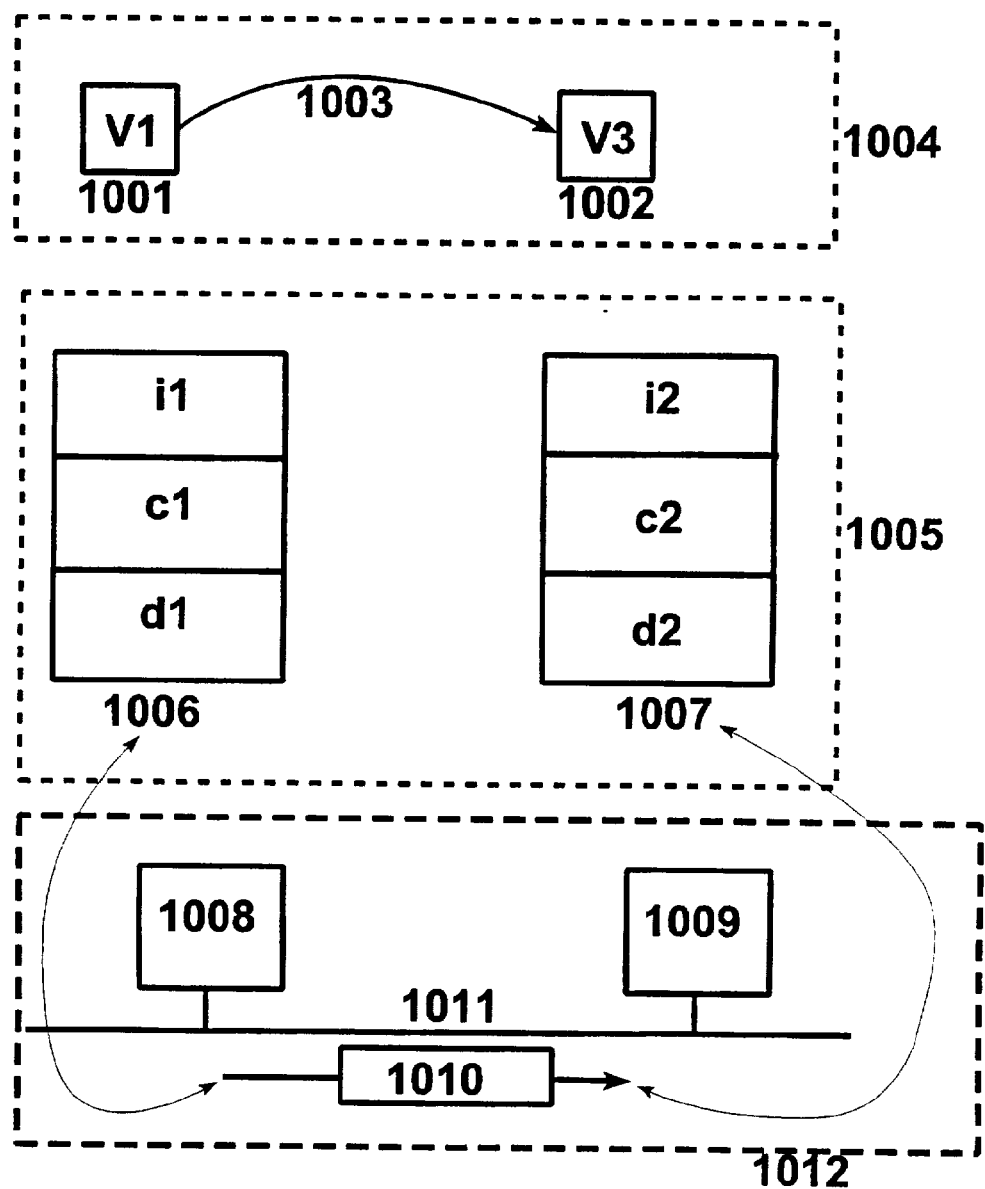
FIG. 10 shows a block diagram of the principles of how the system adaptation information is generated.

On the basis of this information, the system tool can generate system adaptation information, which at least involves combined variables being assigned the same CAN id and the same location in the CAN message. If CAN Kingdom is used, additional information can also be generated, such as Form layout, Document composition, etc. FIG. 10 shows how the system adaptation information is generated in a simple case. In the system description 1004 there are two variables 1001 and 1002 combined (1003) with the described method. From this, the system tool generates templates for the CAN messages 1006 and 1007, with arbitration fields i1 and i2, control fields c1 and c2, and data fields d1 and d2, respectively. Since the variables are coupled together, then i1=i2, c1=c2, and the data fields d1 and d2 will have the same location and structure in both messages. The information is then transferred to the real system 1012 with the corresponding real modules 1008 and 1009, coupled via the CAN bus 1011. The message layout 1006, 1007 agreed between the modules can now be used in the real CAN message 1010. For choosing CAN identifiers, use can be made of the previously mentioned priority order of all the transmit variables in the system. The highest-priority variable is assigned a CAN identifier with lowest numerical value which is not already in the system. Corresponding receive variables are assigned the same identifier. The next highest-priority variable is assigned the next identifier in numerical sequence, in which case the system tool can take into consideration the fact that a certain bit pattern in the identifier is needed, for example for filtering reasons, or some module in the system is using an HLP in which certain bits in the identifier are used to designate certain characteristics of the message (for example DeviceNet).

Figure 11:
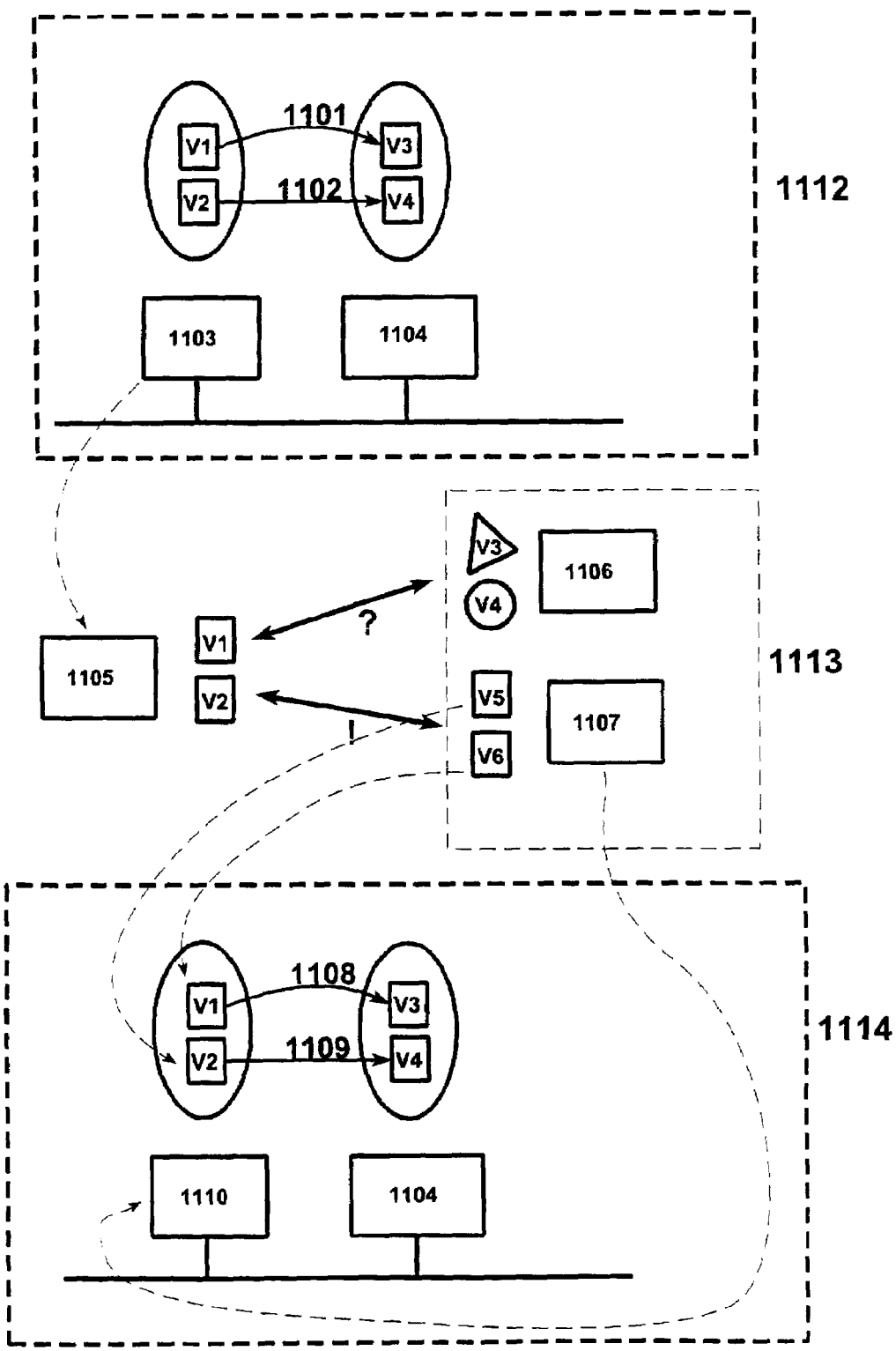
FIG. 11 shows a block diagram of the setting up of a dummy module in the system description.

FIG. 11 shows how a dummy module 1103 in a system description 1112, with variables V1 and V2 (1101, 1102 combined with variables V3, V4 in another module 1104, dummy or real), is replaced by a model of a real module. The module 1103 is marked (1105) and its variables V1, V2 are identified with other module variables (V3, V4 belonging to the module 1106, and V5, V6 belonging to the module 1107). The real module models 1106 and 1107 are stored in the database 1113. In this case module 1107 is suitable, but not 1106. 1107 is therefore extracted from the database and placed in (1110) in the system description 1114. Variable combinations 1108 and 1109 are unchanged, likewise the module 1104.

When satisfied, the system tool generates a largely complete documentation of the principal parts of the system. If the modules in the system follow a higher-level protocol which requires that the modules, during a startup or configuration sequence via the CAN messages, are configured to fit the system, then the system tool generates the necessary adaptation information (see above). If the higher-level protocol is CAN Kingdom, then the system tool generates the necessary king's pages to each module to be sent by the king. In some cases it is also necessary for the module to be supplied with certain information prior to connection to the CAN bus, for example physical address in the network, bit rate for the system and base number. The tool gives a list of such information for each module.

Figure 12:
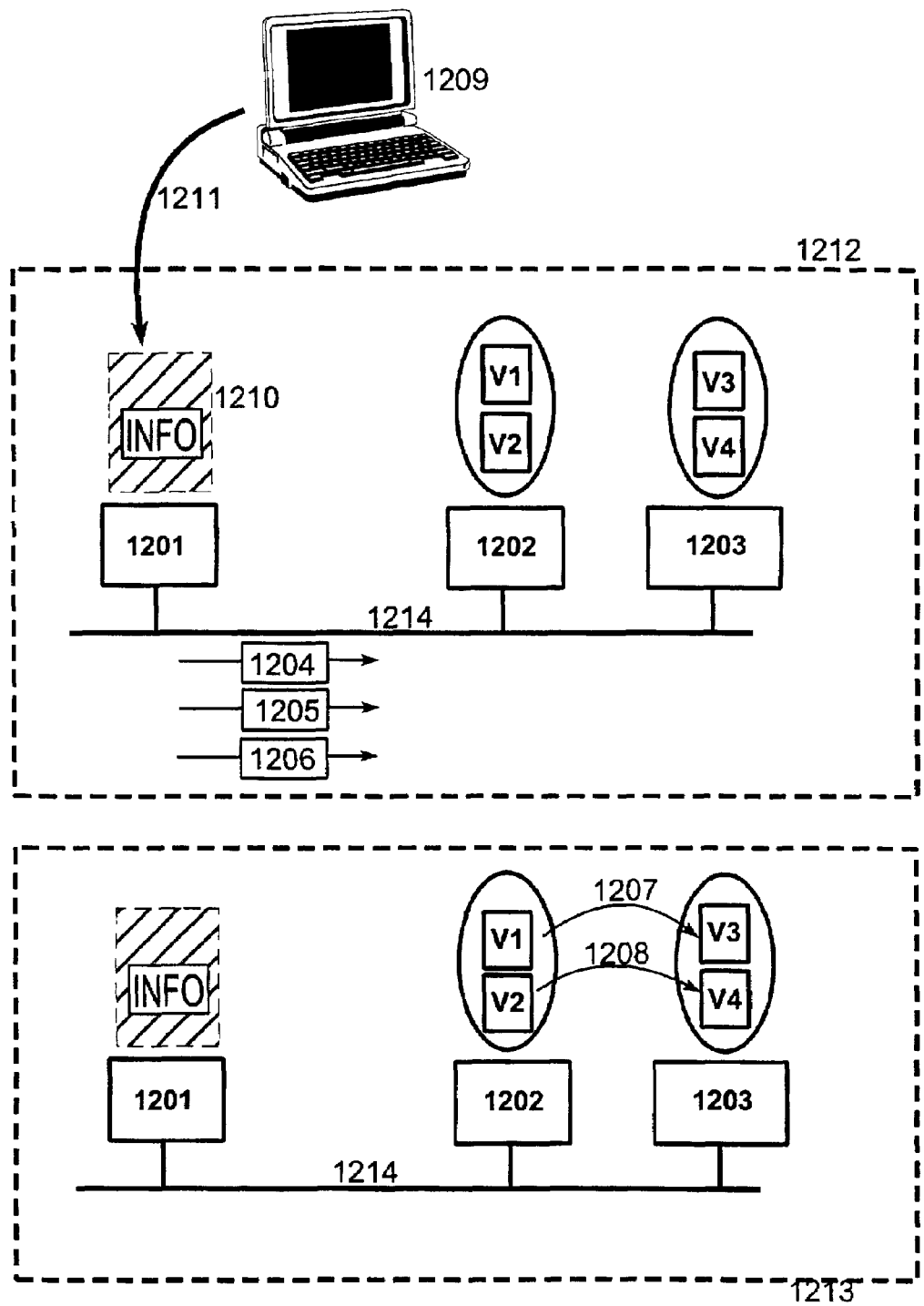
FIG. 12 shows a circuit diagram of how the information is transferred to a system mode included in the equipment.
Figure 13:
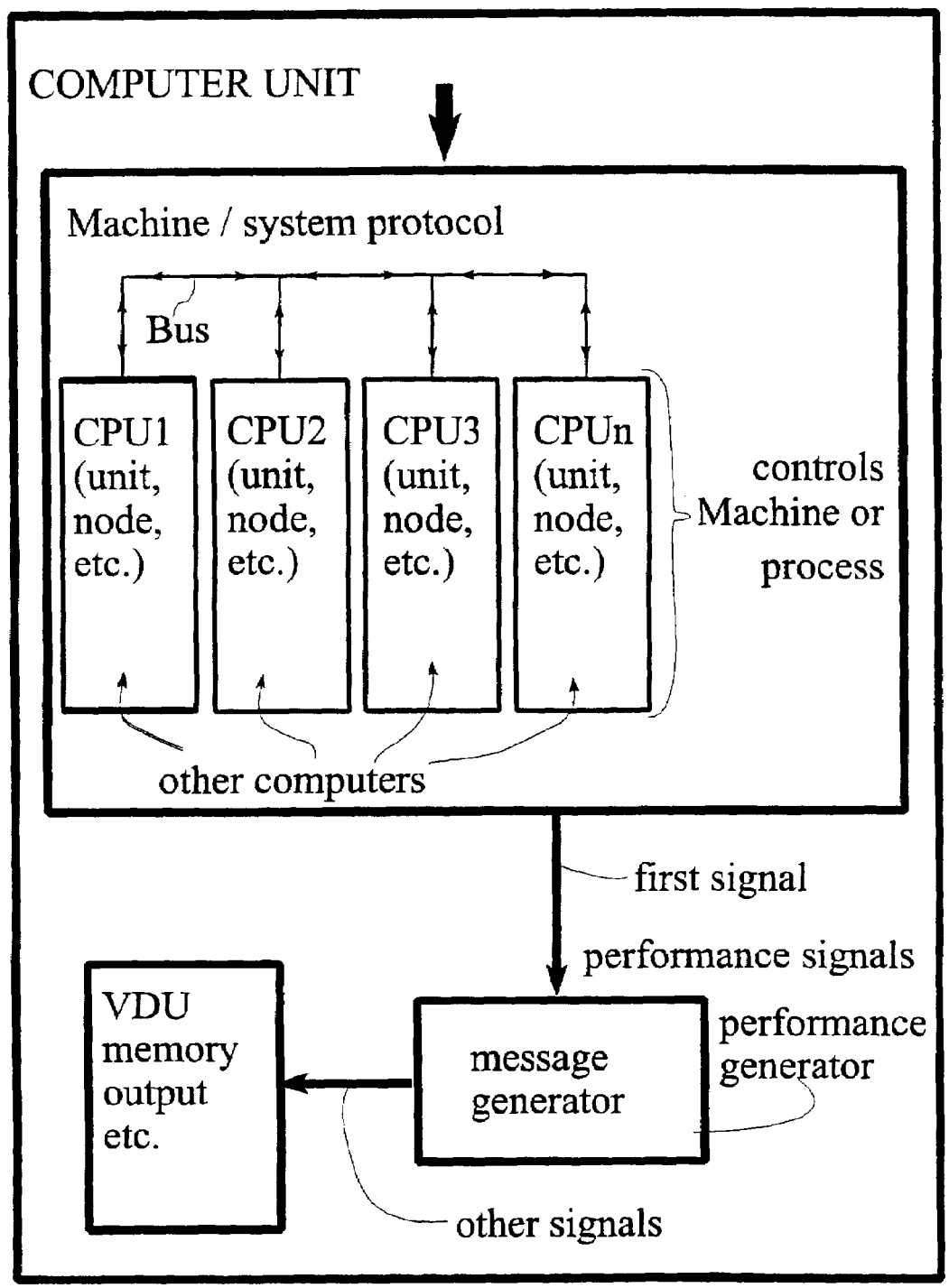
FIG. 13 shows a block diagram of a computer unit with internal units and equipment exchanging signals.
Figure 14:
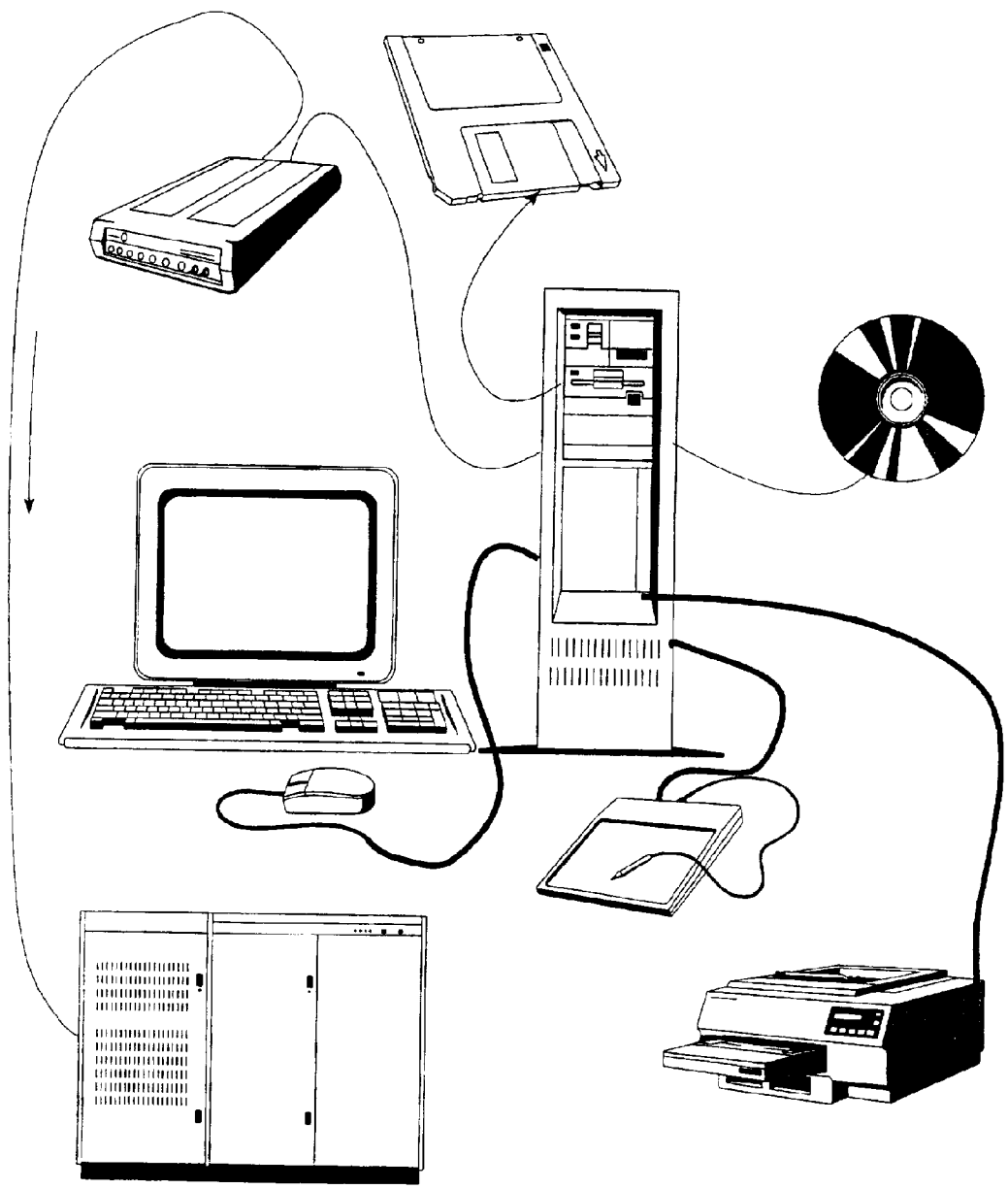
FIG. 14 shows a circuit diagram of the design of a second embodiment of usable hardware.

FIG. 12 shows how the information is transferred to the system node 1201 ("Capital" if CAN Kingdom is used). With the system tool driven in a computer 1209, system adaptation information 1210 is generated in accordance with the described method. The information is transferred (1211), for example, via the CAN bus or another serial communication, depending on what the module 1201 does, or is programmed directly into the module's PROM. By sending the CAN messages 1204, 1205, 1206 using any suitable HLP (DeviceNet, CAN Kingdom), the module 1201 can now establish connection between the modules 1202 and 1203, so that the combinations 1207, 1208 defined in the system description are implemented. The modules 1202 and 1203 will thereafter send the CAN messages (1010) on the agreed layout and with the agreed identifier, in the manner shown in FIG. 10.

The system designer now has a system specification and a basis for system description. Depending on the chosen higher-level protocol, the system tool can generate the necessary adaptation information, for example the abovementioned king's pages for CAN Kingdom. The tool can generate this information in several ways, for example as paper printout. In many cases it is advantageous for the information to be generated in the form of a text file which can then be read into other computer programs, for example word processors, for further processing. Since the information is important for further processing, so the text file should be provided with information on the individual and/or company responsible for creating the file, with which tool it has been created, and some form of protection against corruption. An EAN code may be suitable for identifying the company and tool. This also allows identification of the individual to be included, for example by the serial number consisting of the individual's registration number. To ensure that the text file remains uncorrupted, it can be provided with a check code in accordance with any currently accepted method. If the system node is supported by the system tool, the latter can generate a compilable code, for example a C-code, of the adaptation information.

During this work, the user of the system tool can analyze the system from different aspects. For example, it is possible to calculate whether the system can be implemented from the point of view of real time. This is done by specifying, for each variable-to-variable coupling, a deadline and a periodicity. On the basis of known algorithms (Tindell), the system tool can then calculate which identifiers the different messages have to use, or give an error message if the deadlines cannot all be satisfied.

Summary of the setup process.

Figure 8:
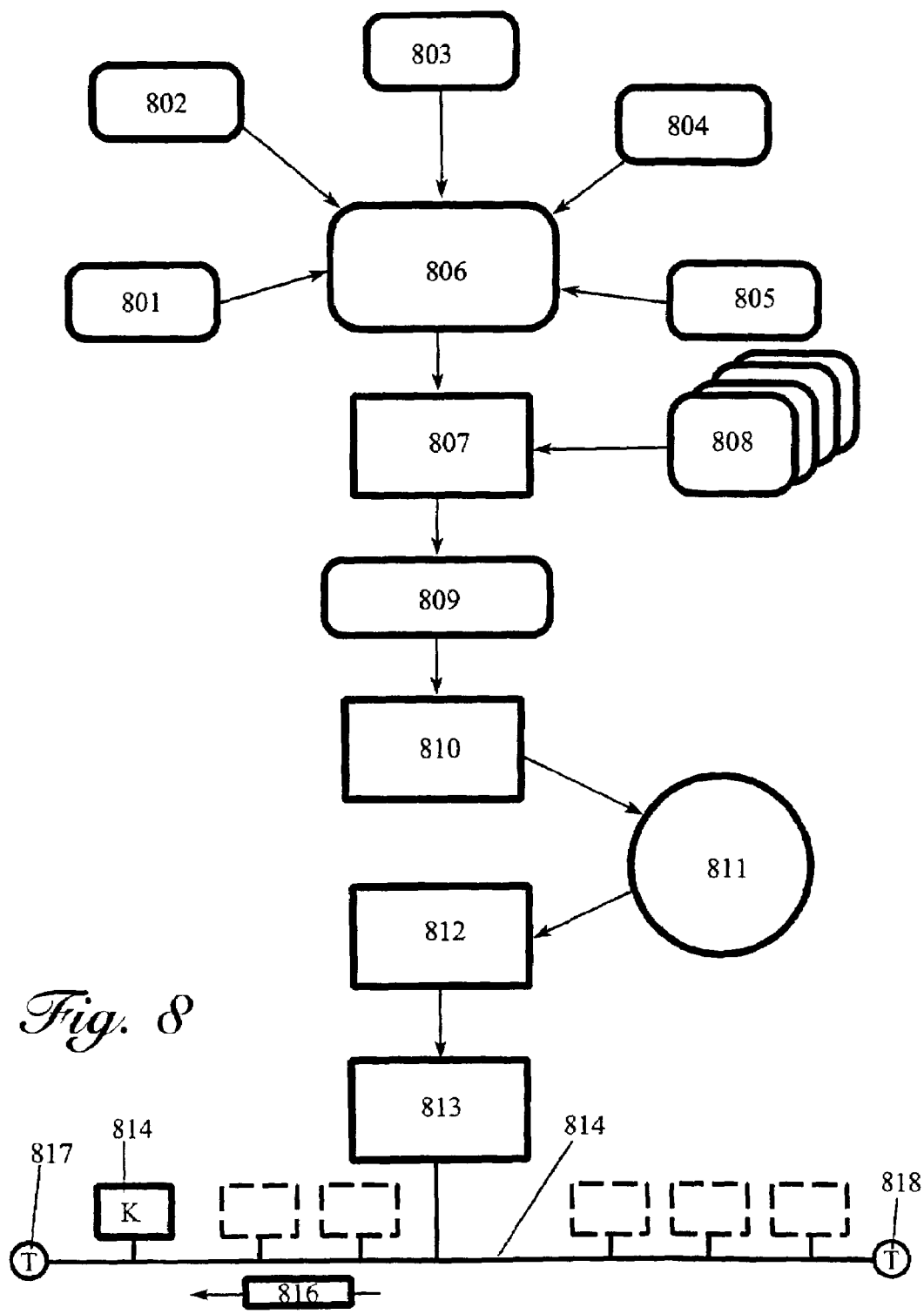
FIG. 8 shows a circuit and block diagram of the process for setting up a system in question.

The process for setting up a system is shown in FIG. 8. Thus, first of all, module designers each create an individual description of their modules using the module tool. Respective descriptions 801, 802, 803, 804 and 805 are combined in a common database 806 which is available in the system designer's computer 807. The system designer creates a number of dummy modules represented by 808 in the computer 807. These are compared with those in 806 and, by the iterative method described, the system designer finally arrives at a specification 809. This specification is processed to form a documentation of the system and a basis for programming each module in the computer 810 (which itself can be the same as 807). This basis is represented by 811. The basis is processed in the computer 812 to give a source code, and this source code is compiled to give an object code adapted to the receiving module. This process can be manual, but it can also be automated. The object code thus generated can be transferred to a computer 813 equipped with the possibility of connection to a CAN bus. 812 and 813 can be one and the same computer, but it is more practical, from the production viewpoint, if they are separate. The computer 813 is connected to the CAN bus 814 and the object code is transferred to the node 815 (which must be programmed up) via CAN messages 816 as a fragmented file transfer protocol. If the system is built up in accordance with CAN Kingdom, then this transfer can follow the block transfer specified therein, and the node 815 is then the king node in the system. Other nodes are indicated by broken lines in the figure, and the terminations are marked by 817 and 818.

The invention claimed is:

1. A method for generating, by means of one or more programmed computer units, a system protocol for a system which comprises a number of control modules which communicate with each other via a serial digital connection in accordance with said system protocol, the method comprising:

feeding a first memory location with first data concerning a base protocol according to a Controller Area Network (CAN) protocol;

supplying said first memory location with second data of one or more additional protocols which define basic functions for the modules to communicate;

supplying a second memory location with third data concerning a base protocol according to a Controller Area Network protocol;

supplying said second memory location with fourth data concerning one or more additional protocols which define basic functions for the modules to communicate; and generating computer code for implementing the system protocol in response to a user selection based on said first, second, third and fourth data in said first and second memory locations.

2. The method as claimed in claim 1, further comprising generating data which can be related to the system protocol and transferring said data to a separate database.

3. The method as claimed in claim 1, further comprising generating data which can be related to the system protocol and transferring said data via said connection to selected control modules.

4. The method as claimed in claim 1 or 2 or 3, further comprising:
displaying first design features for the base protocol by means of a first user selection; and
displaying, on the basis of a second selection, second design features for one or more of the additional protocols; and
selecting said second design features based on said second selection by means of a third selection to incorporate said second design features in said first design features.

5. The method claim as claimed in claim 4 further comprising defining variables, forms, documents, folders, and envelopes to obtain a module definition, and in a parallel and optionally simultaneous activity defining the hardware, module parameters and configuration primitives.

6. The method according to claim 1, further comprising selecting CAN identifiers which are to be included in the system protocol.

7. The method as claimed in claim 1, further comprising selecting and assembling the modules and coupling units of the system by means of the programmed computer units.

8. The method as claimed in claim 7, wherein adaptation information for said modules and coupling units is generated in the form of a text file.

9. The method as claimed in claim 8, wherein the text file further contains information concerning the identity of the system designer.

10. The method as claimed in claim 9, further comprising displaying a graphic image of the assembly of the modules on the screen, for indicating a logical coupling of the modules.

11. The method as claimed in claim 10, further comprising inputting information including the connection length of the leads between the modules, and physical data limiting the communication performance, into each module and programmed computer calculating from said information theoretically limiting physical values for secure communication and displaying said theoretically limiting physical values.

12. The method as claimed in claim 11, further comprising inputting a maximum permitted transmission time of the messages, between modules and schematizing the messages in order to satisfy these requirements.

13. The method as claimed in claim 1, wherein module adaptation information is generated in the form of compilable data code and sent to said modules.

14. The method as claimed in claim 1, further comprising creating a system model having dummy modules having desired characteristics and comparing the desired characteristics with modules models in a database, and displaying a suitable module model(s) from the comparison wherein the system designer can replace the dummy module(s) in his system model with the model module(s) in the database.

15. The method as claimed in claim 14, further comprising: generating the module information in a first unit, and creating the system model in a second unit, and transferring the module information from the first unit to the second unit via a data transfer medium, and storing the information from the first unit in the second unit in a database where it can be linked to one or more module models in the system model.

16. A method for generating, by means of one or more programmed computer units, a system protocol for a system which comprises a number of control modules which communicate with each other via a serial digital connection in accordance with said system protocol, the method comprising:
feeding a first memory location with first data concerning a base protocol according to a CAN (Controller Area Network, standard ISO 11 898) protocol and supplying said first memory location with second data of one or more additional protocols which define basic functions for the modules to communicate;
supplying a second memory location with third data concerning a base protocol according to a CAN (Controller Area Network, standard ISO 11 989), protocol and supplying said second memory location with fourth data concerning one or more additional protocols which define basic functions for the modules to communicate;
generating, in response to a user selection, the system protocol, based on said first, second, third and fourth data in said first and second memory locations;
creating a system model having dummy modules having desired characteristics and comparing the desired characteristics with modules models in a database, and displaying a suitable module model(s) from the comparison wherein the system designer can replace the dummy module(s) in his system model with the model module(s) in the database;
generating the module information in a first unit, and creating the system model in a second unit;
transferring the module information from the first unit to the second unit via a data transfer medium and storing the information from the first unit in the second unit in a database where it can be linked to one or more module models in the system model;
coupling models of modules included in the system to form a network;
modeling the physical characteristics of the module couplings;
creating messages to be sent to each module;
displaying the performance of the system model;
comparing system requirements to the displayed performance and modifying said model of the system to obtain the system requirements,
comparing the requirements of parts included in the system with models present in the database, and selecting modules which best correspond to the system model;
displaying the selected model on the screen, and replacing created models with those selected in the database; and
testing the new system model against the established requirements.

17. A method for producing a system protocol by one or more computer units, for control and/or monitoring equipment for one or more machines and/or processes of a system which comprises a number of computerized modules which communicate with each other via a serial digital connection in accordance with said protocol or protocols comprising:
generating in a first phase, preliminary modules included in a prototype system in accordance with the set requirements, using a system tool (computer program) to carry out a check in interaction with a user, to obtain a system which operates in a logically correct (predetermined) manner, and measuring the performance of the system by means of a system tool;
comparing in a second phase, the preliminary modules with existing modules described in a database, selecting one or more real modules for replacing one or more preliminary modules, and checking with the system tool the system's performance, and determining from the system tool any deviations and necessary corrections, for establishing a final prototype system.

18. The method as claimed in claim 17, wherein, in a third phase, generating adaptation information for each selected module, and a documentation of the system, and generating a compliable code for the system's configuration and startup procedure with the system tool.

19. A method for producing a system protocol by means of one or more computer units, based on the CAN protocol of a system which comprises a number of computerized modules which can communicate with each other via a serial digital connection in accordance with said protocol, and the system is simulated on one or more computer screens as a prototype, comprising:
   a) setting up descriptions of the modules by means of one or more module tools (programs) in one or more first computers,
   b) setting up a number of preliminary modules included in the prototype in one or more second computers,
   c) setting up, by an iterative procedure, a description of the prototype set up
   d) determining documentation of the system and basis for programming the respective module in the second computer(s) from the description,
   e) setting up source code with the aid of the determined basis,
   f) compiling the source code to object code for a receiving module,
   g) transferring the object code to a computer connected to a CAN bus, and
   h) transferring said object code to a receiving module connected to said CAN bus.

20. The method as claimed in patent claim 19, comprising transferring the object code to a module (node) which is programmed by means of a message as a fragmented file transfer protocol, where, the transfer follows a specified block transfer when the node/module is the a king node/ module in the system.

21. A method for generating a system protocol for a system having plural control modules which are arranged to communicate with each other via said system protocol, the method comprising:
   storing, in a first memory location, base protocol data and data that defines basic functions of an additional protocol for the modules to communicate one or more which define
   supplying a second memory location with third data concerning the base protocol;
   supplying said second memory location with fourth data concerning one or more additional protocols which define basic functions for the modules to communicate, and
   generating computer code for implementing the system protocol based on said first, second, third and fourth data.

22. A method for generating a system protocol for a system having plural control modules, the method comprising:
   providing dummy module models for evaluation in an initial system model;
   assessing performance of the dummy modules in the initial system model;
   comparing the dummy module models with descriptions of real modules;
   selecting, for each dummy module model, possible real module models;
   replacing one or more of the dummy module models with selected real module models to develop a revised system model;
   assessing performance of the revised system model and identifying any necessary corrections to the selected real module models;
   developing a final system model using the revised system model as modified in response to any identified necessary corrections;
   generating necessary adaptation information for each module in the final system model; and
   generating the system protocol using the adaptation information.

23. A system tool that generates a system protocol for a system having plural control modules, the system tool comprising:
   means for inputting hardware descriptions of system components;
   means for creating dummy modules by using the hardware descriptions and variable definitions related to information to be sent between different nodes in the system;
   means for assessing performance of the dummy modules in an initial system model;
   means for comparing the dummy modules with descriptions of real modules contained in a database;
   means for selecting one or more real modules that correspond to an associated one or more of the dummy modules;
   means for assessing performance of the selected one or more real modules and identifying any necessary corrections to a system design;
   means for developing a final system design using the identified necessary corrections;
   means for generating necessary adaptation information for each module in the final system model; and
   means for generating computer code for the system protocol using the adaptation information.

24. A computer-readable medium containing computer code which, when executed on a computer, carries out instructions for:
   evaluating dummy module models;
   comparing the dummy module models with descriptions of real modules in a database;
   selecting, for each dummy module model, possible real module models;
   replacing one or more of the dummy module models with selected real module models;
   assessing performance of the selected real module models;
   identifying any deviations or necessary corrections between the one or more dummy module models and selected real module models;
   generating necessary adaptation information for each module in a final system model; and
   using the adaptation information to generate compilable code for a system protocol for a system comprising a number of control modules which communicate with each other via a serial digital connection in accordance with said system protocol.

* * * * *